(12) United States Patent
Nevarez Pedroza

(10) Patent No.: US 9,380,615 B2
(45) Date of Patent: Jun. 28, 2016

(54) MANAGING A GROUP OF WIRELESS DEVICES IN CLOSE PROXIMITY

(71) Applicant: HTI IP, LLC, Atlanta, GA (US)

(72) Inventor: Aaron Olaff Nevarez Pedroza, San Diego, CA (US)

(73) Assignee: Verizon Telematics Inc., Atlanta, GA (US)

( * ) Notice: Subject to any disclaimer, the term of this patent is extended or adjusted under 35 U.S.C. 154(b) by 93 days.

(21) Appl. No.: 14/308,820

(22) Filed: Jun. 19, 2014

(65) Prior Publication Data

US 2015/0373747 A1 Dec. 24, 2015

(51) Int. Cl.
*H04B 7/00* (2006.01)
*H04W 76/02* (2009.01)
*H04W 4/00* (2009.01)

(52) U.S. Cl.
CPC .............. *H04W 76/02* (2013.01); *H04W 4/008* (2013.01)

(58) Field of Classification Search
CPC .............................. H04W 76/02; H04W 4/008
USPC ................ 455/41.2, 569.2, 567, 556.2, 562.1
See application file for complete search history.

(56) References Cited

U.S. PATENT DOCUMENTS

| 8,213,395 | B2 * | 7/2012 | Trachewsky | H04L 27/0012 370/338 |
|---|---|---|---|---|
| 8,270,310 | B2 * | 9/2012 | Raleigh | G06Q 10/06375 370/252 |
| 8,300,609 | B2 * | 10/2012 | Thoukydides | H04J 3/0658 370/336 |
| 8,364,080 | B2 * | 1/2013 | Desai | H04W 16/14 455/41.2 |
| 8,588,698 | B2 * | 11/2013 | Brisebois | H04W 88/06 455/63.1 |
| 8,737,994 | B2 * | 5/2014 | Awoniyi | H04W 52/0206 370/311 |
| 8,938,255 | B2 * | 1/2015 | Tsruya | G01S 5/0252 455/404.2 |
| 8,954,051 | B2 * | 2/2015 | Tinnakornsri-suphap | H04W 36/04 370/331 |
| 9,019,985 | B2 * | 4/2015 | Nandagopalan | H04W 36/385 370/447 |
| 9,031,604 | B2 * | 5/2015 | Desai | H04L 1/1854 455/41.2 |
| 9,059,782 | B2 * | 6/2015 | Desai | H04B 1/406 |
| 9,066,197 | B2 * | 6/2015 | Kiukkonen | H04W 52/0229 |
| 9,070,100 | B2 * | 6/2015 | Davidson | G08G 1/0112 |
| 9,183,412 | B2 * | 11/2015 | Bye | G06F 21/74 |
| 2013/0132854 | A1 * | 5/2013 | Raleigh | G06F 3/0482 715/738 |

\* cited by examiner

*Primary Examiner* — Marceau Milord

(57) ABSTRACT

A first device may transmit a message, such as a connection request, to a second device, and the message may include a friendly name associated with the first device. A connection may be established between the first and second devices based on the message, and first data may be transmitted via the connection. The first device may generate a modified message by modifying the friendly name based on second data, and the first device may forward the modified message to a third device. The third device may evaluate the modified message to identify and extract the second data.

20 Claims, 13 Drawing Sheets

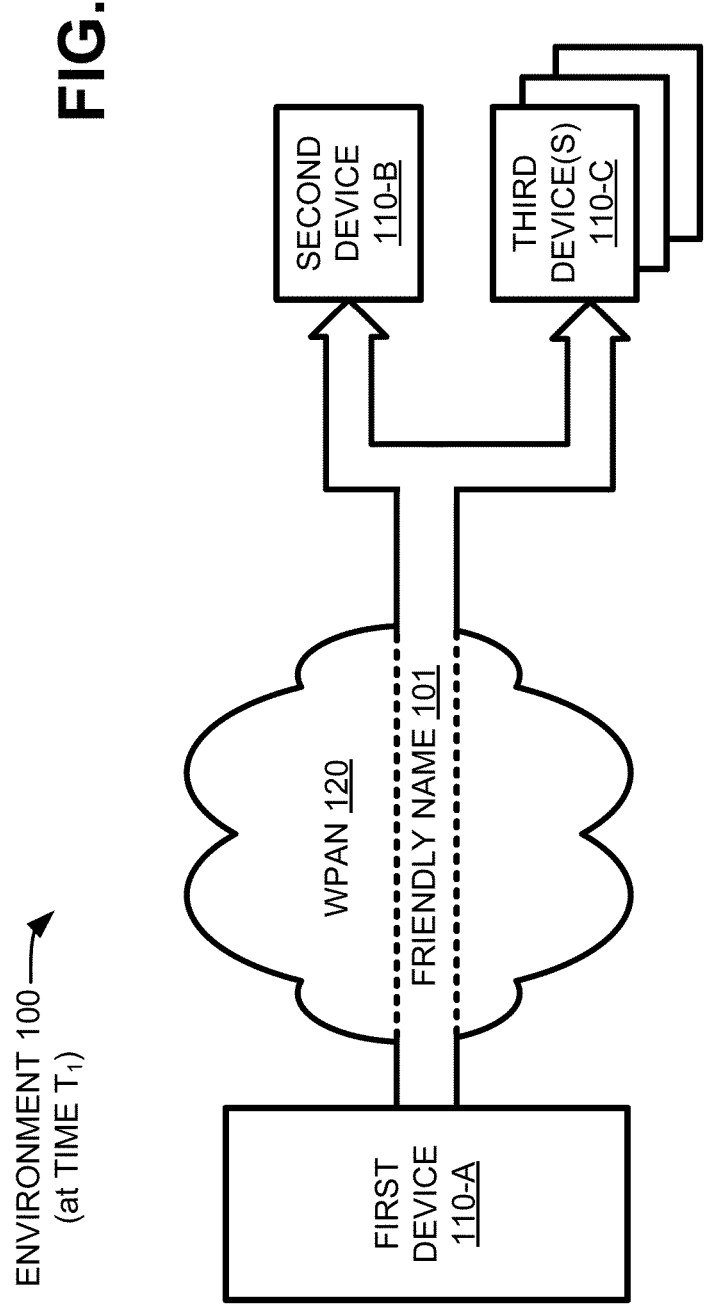

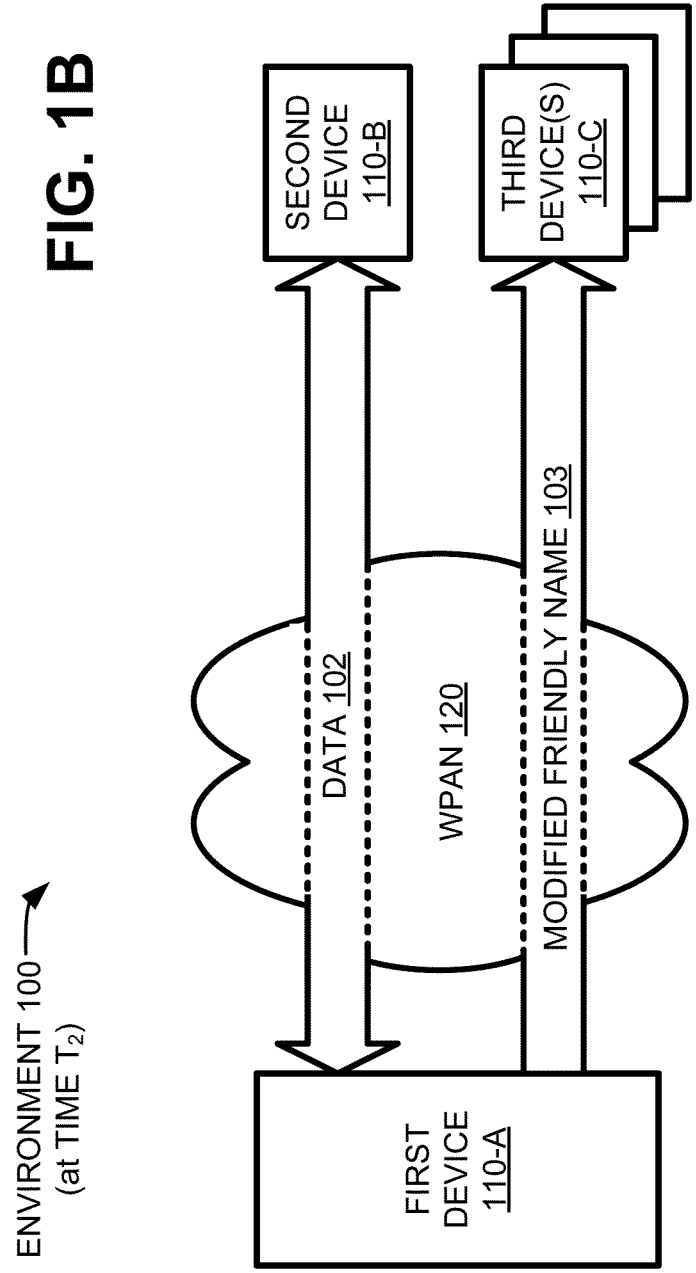

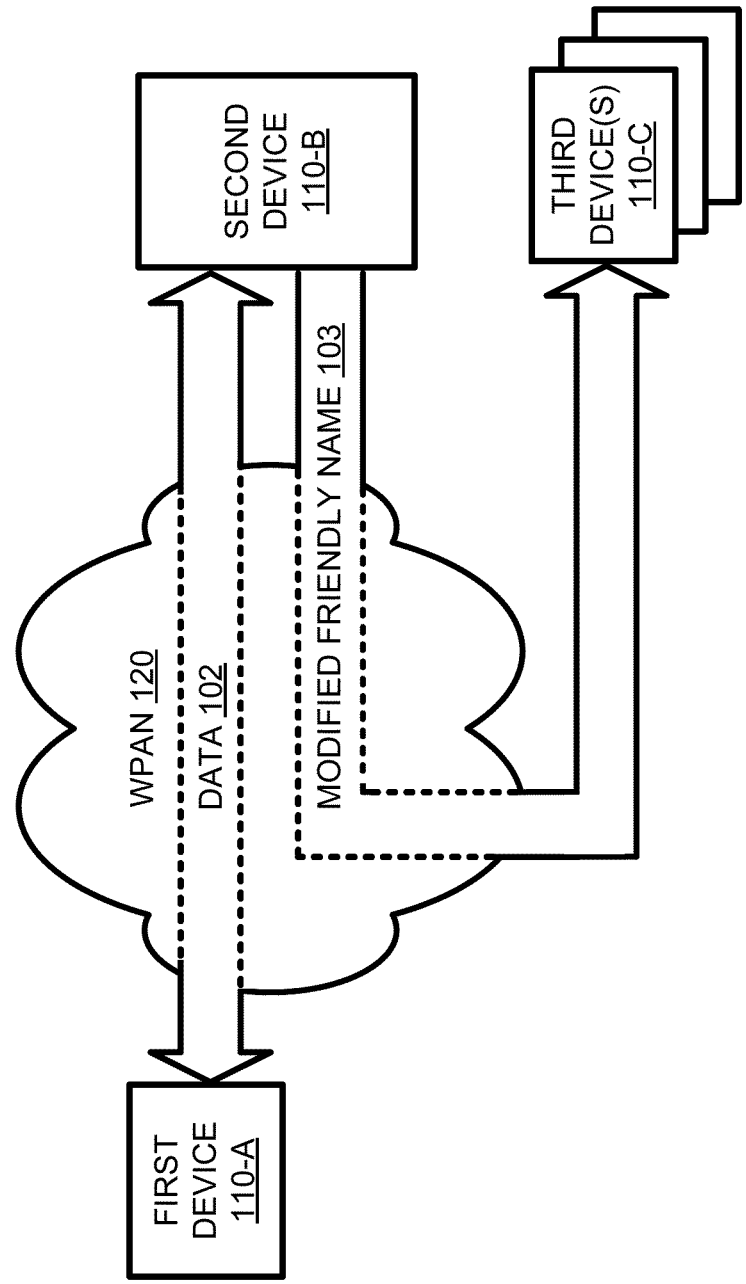

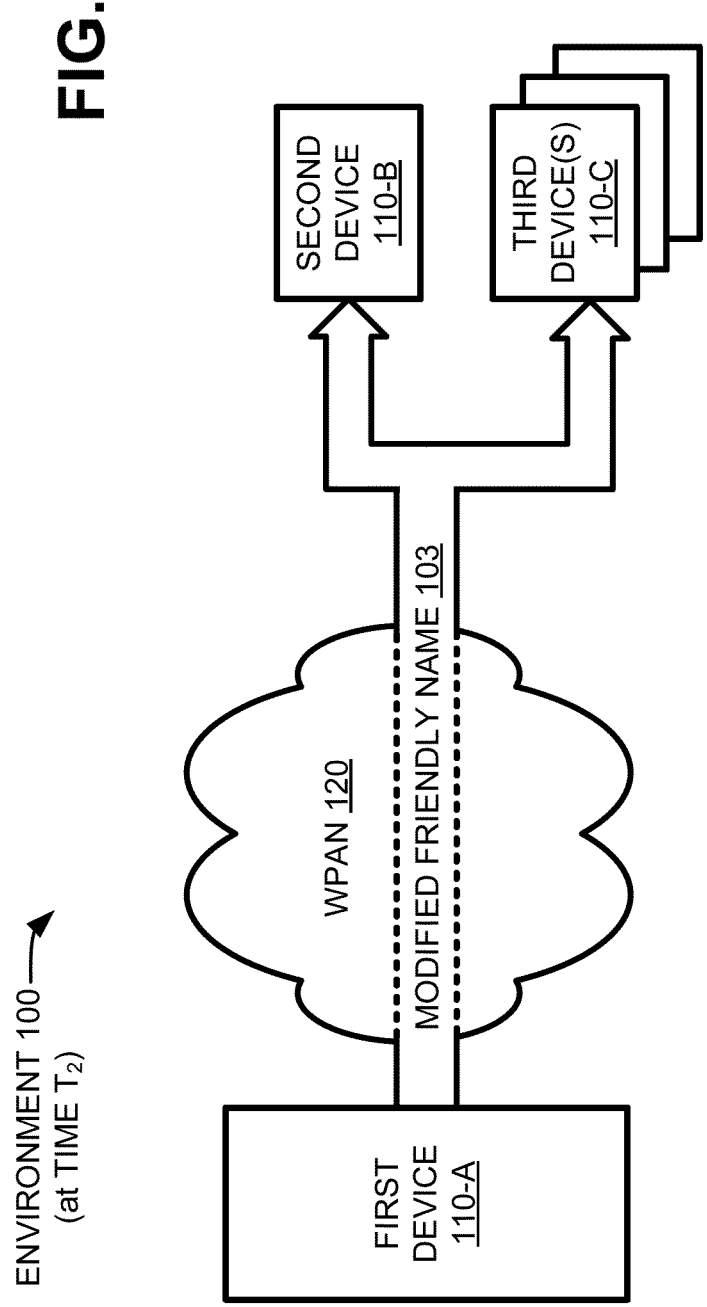

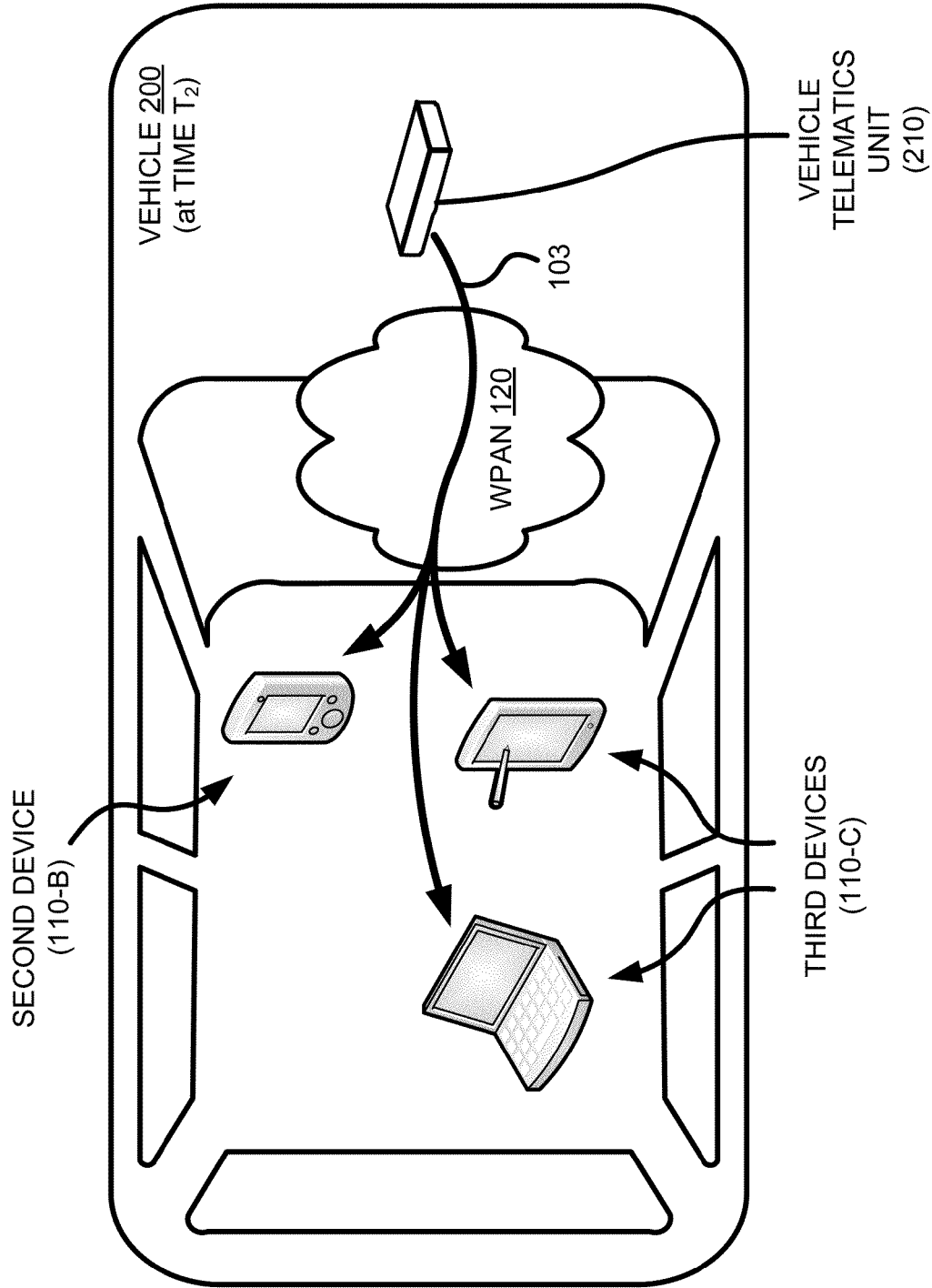

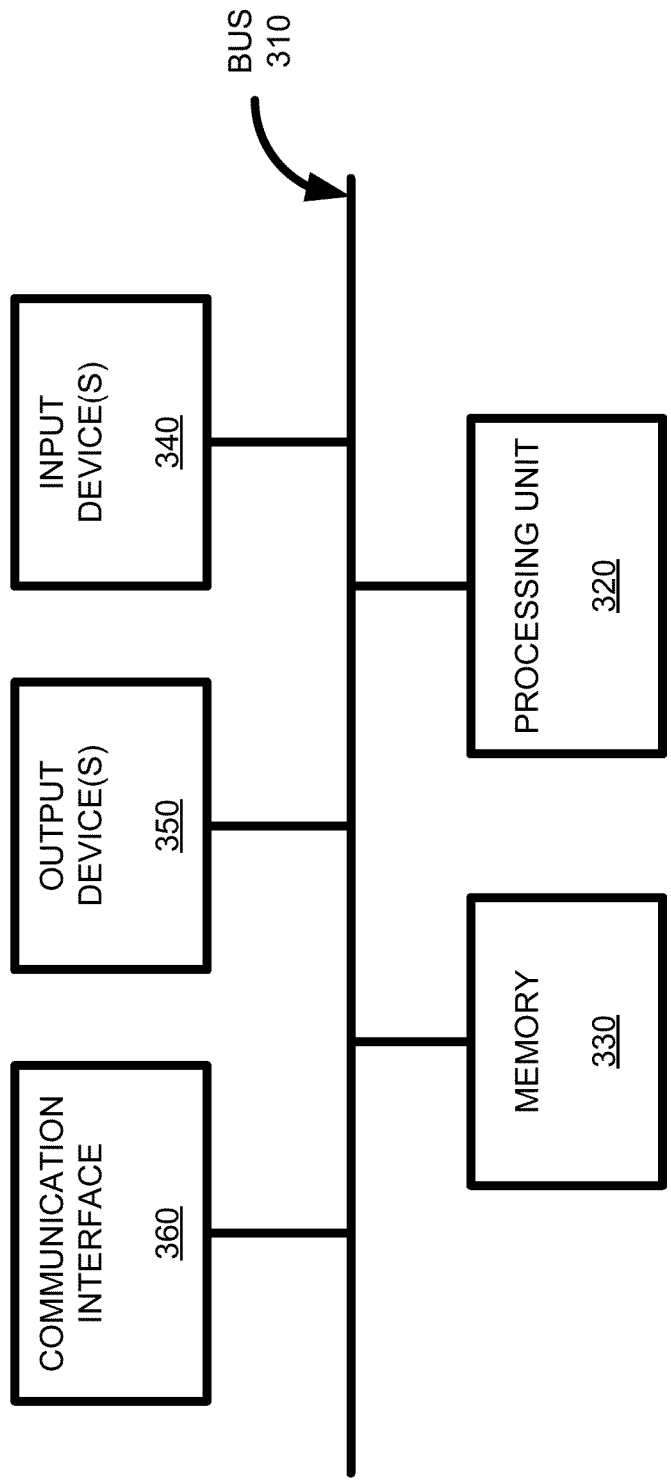

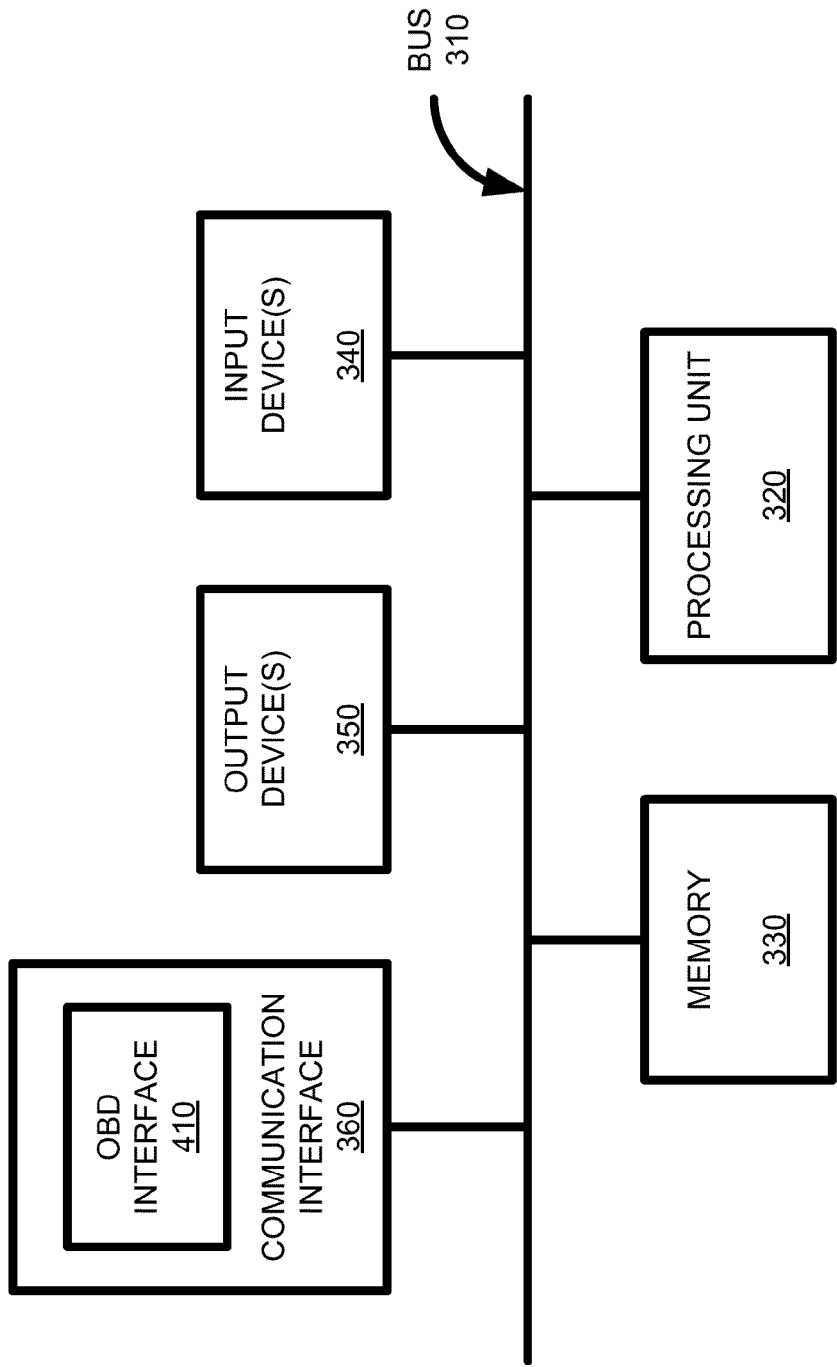

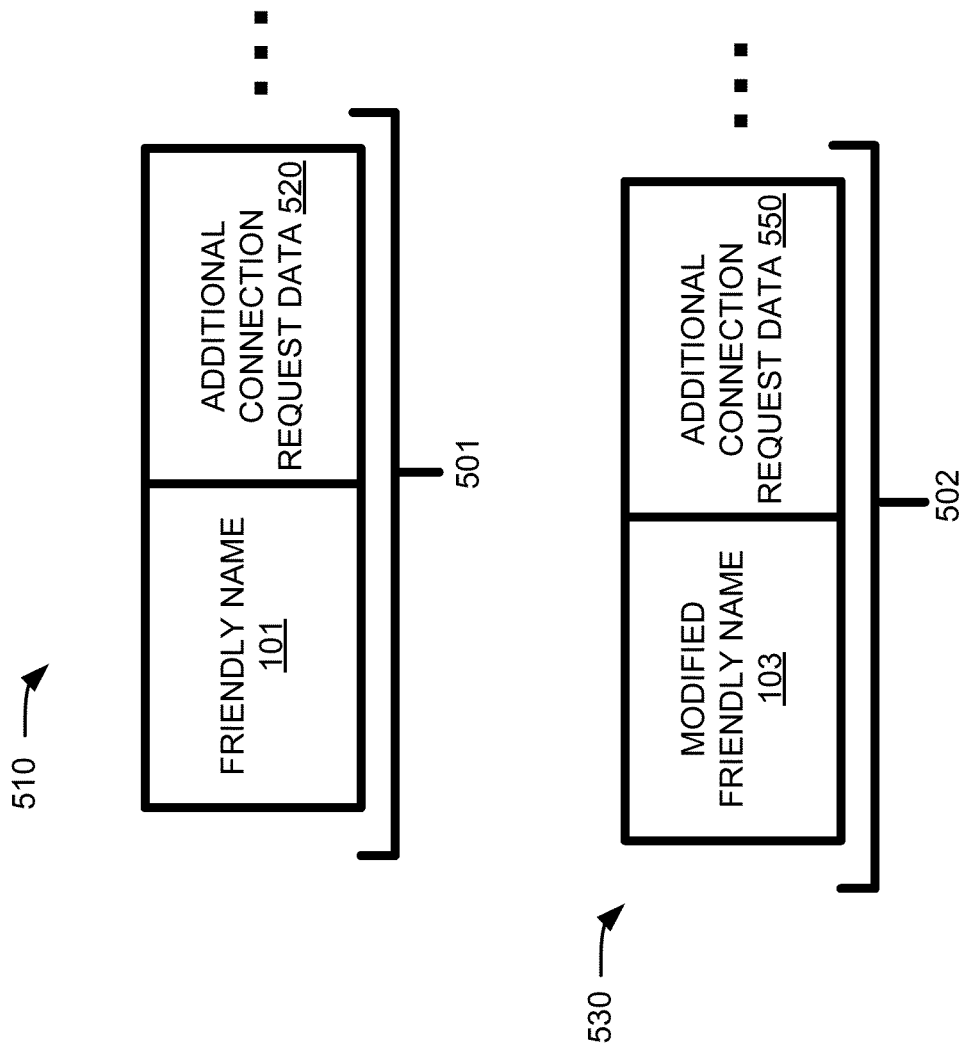

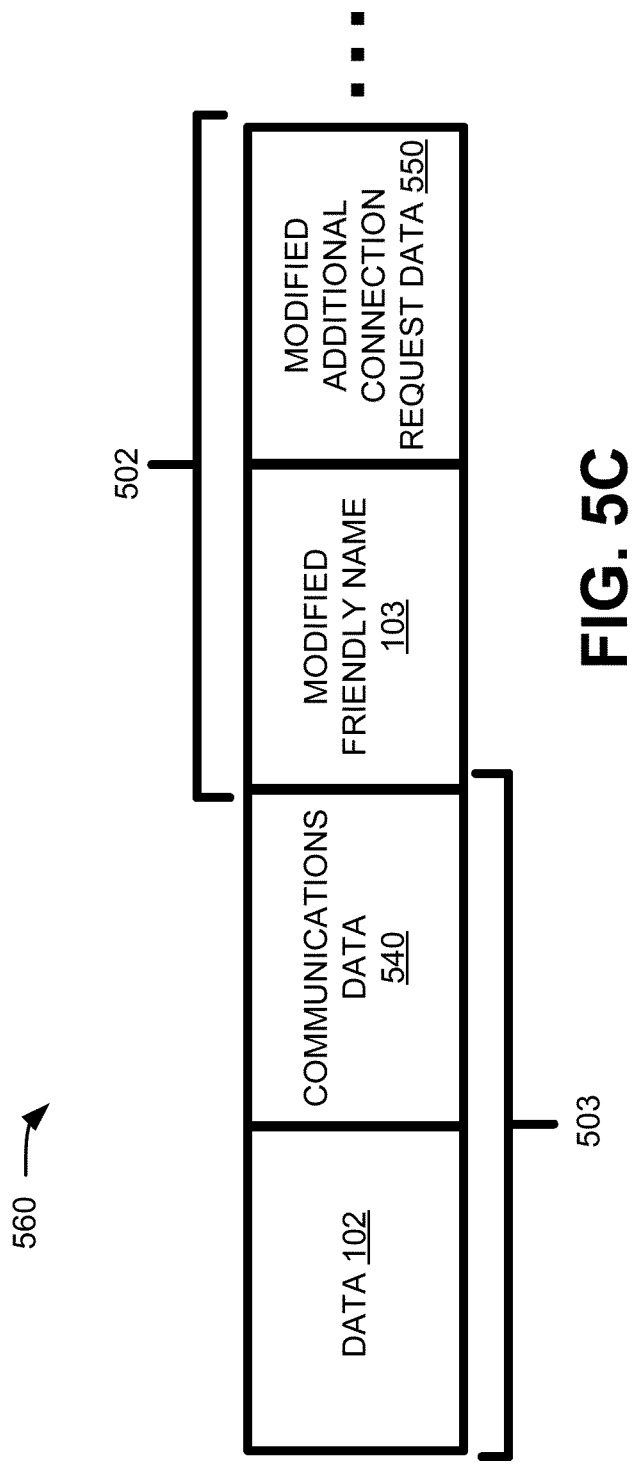

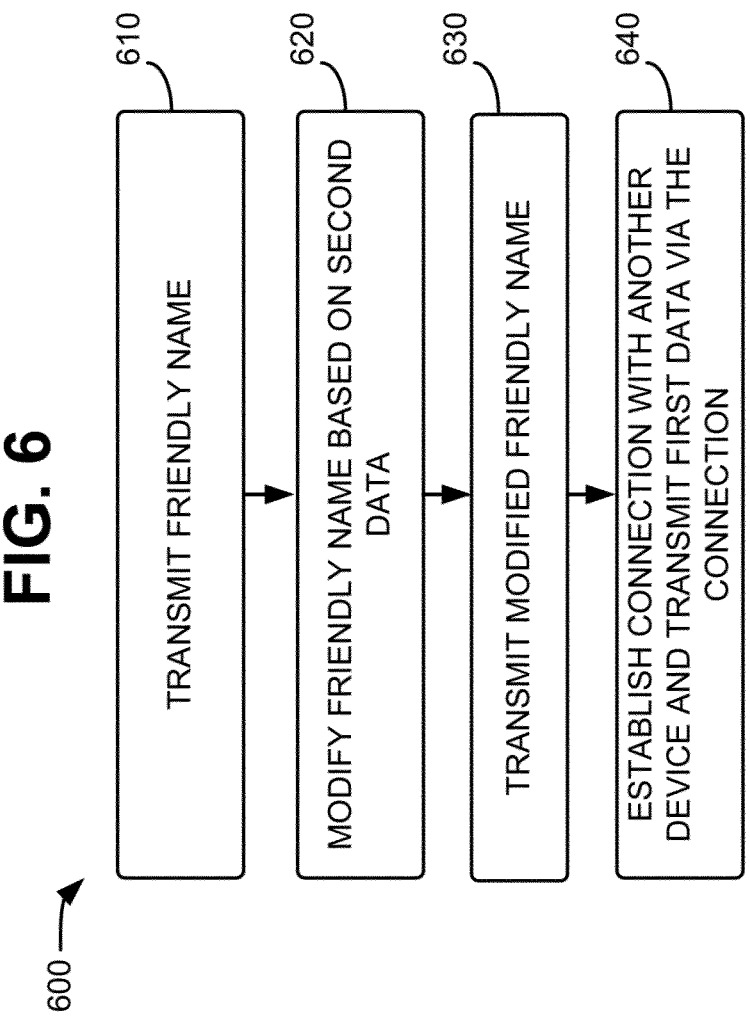

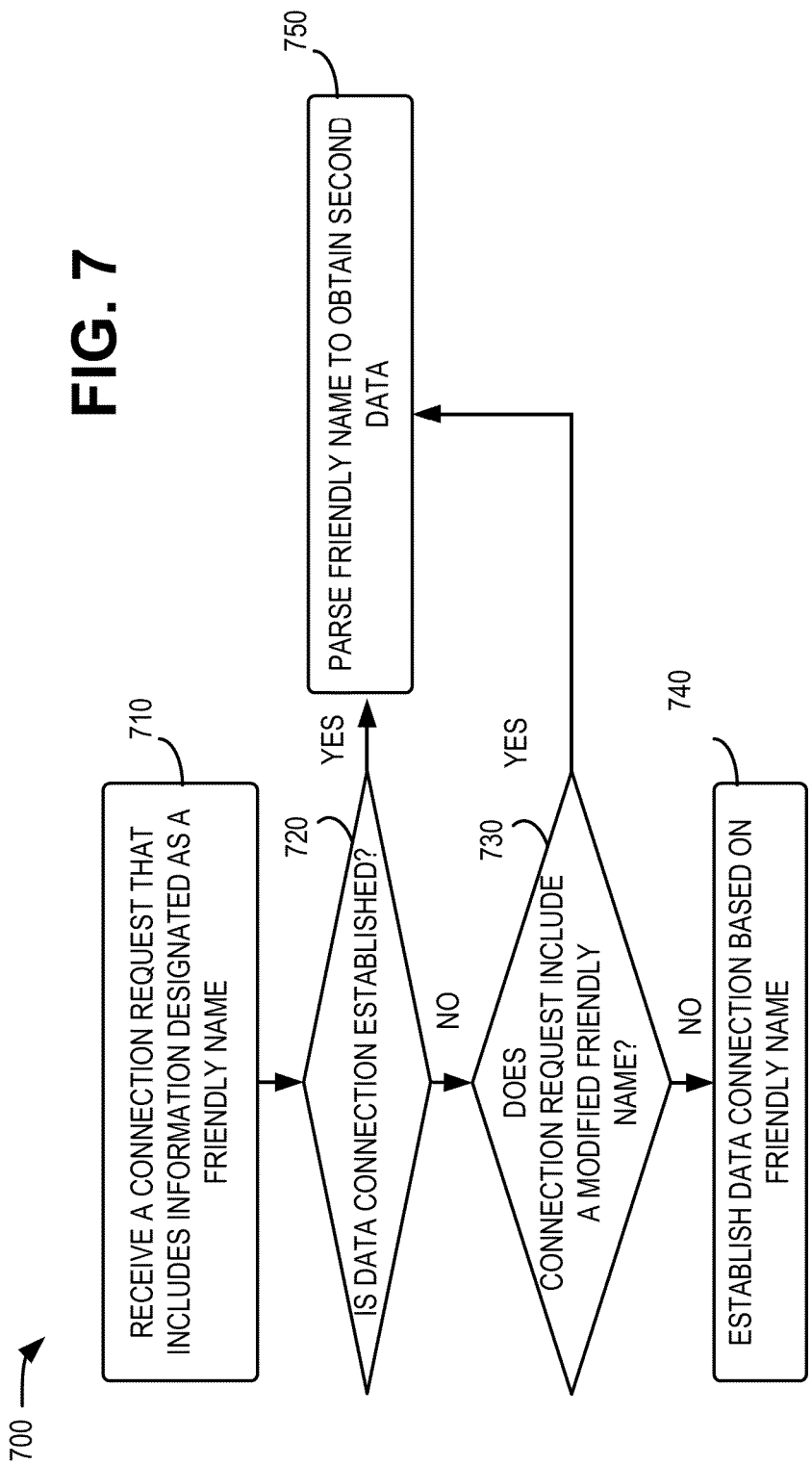

MANAGING A GROUP OF WIRELESS DEVICES IN CLOSE PROXIMITY

BACKGROUND

Devices may wirelessly communicate over short distances (e.g., within a few meters) using a wireless personal area network (WPAN). Devices may communicate over a WPAN using, for example, radio signals (e.g., Bluetooth® or Wi-Fi®) and/or infrared signals (e.g., Infrared Data Association, or IrDA). In a WPAN, two devices may pair (e.g., establish a wireless connection) to exchange data when brought in proximity of one another. When the two devices are paired and communicating wirelessly, other wireless communications via the WPAN may be minimized to interference and/or to prevent unauthorized access to the exchanged information.

BRIEF DESCRIPTION OF THE DRAWINGS

FIGS. 1A-1D show components and communications in an exemplary environment in which systems and/or methods described herein may be implemented;

FIGS. 2A-2C show exemplary components and communications of an implementation of the environment, shown in FIGS. 1A-1C, that includes a vehicle telematics unit;

FIG. 3 shows exemplary components of the device included in the environment depicted in FIGS. 1A-1C;

FIG. 4 shows exemplary components of a vehicle telematics unit depicted in FIGS. 2A and 2B;

FIGS. 5A-5C show exemplary communications that may be exchanged between the components of the environment, shown in FIGS. 1A-1C;

FIG. 6 shows a flow chart of an exemplary process for transmitting data between multiple components of the environment, shown in FIGS. 1A-1C using different friendly names; and FIG. 7 shows a flow chart of an exemplary process for handling a connection request within the environment shown in FIGS. 1A-1C.

DETAILED DESCRIPTION

Figure 2A:
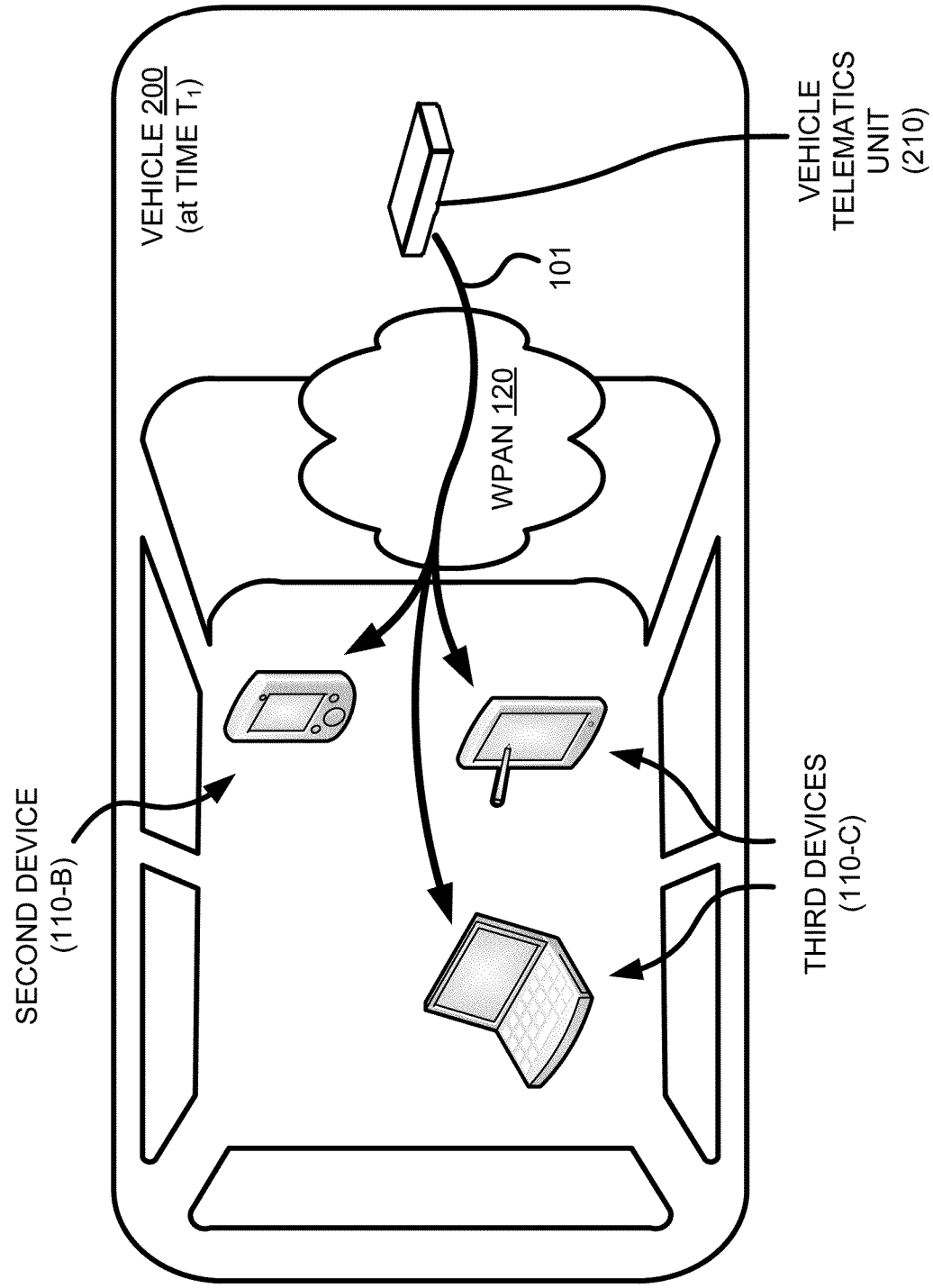

The following detailed description refers to the accompanying drawings. The same reference numbers in different drawings may identify the same or similar elements.

In systems and methods described herein, a message may include a friendly name associated with a first device, and the message may relate to establishing an in-band communication, via a WPAN, between the first device and a second, different device. The first device may generate a modified message by replacing, augmenting and/or modifying, in the message, the friendly name with second data, and the first device may forward the modified message to a third device in an out-of band communication. The in-band connection may be established between the first and the second devices based on the message, and the first data may be transmitted via the connection.

The first, second, and third devices may be devices in a WPAN, such as a Bluetooth® network, and the modified message may be used to distribute the second data between the first and third devices even if the WPAN would support a data connection between the first and third devices (e.g., based on a connection being previously established between the first and third devices).

In one implementation, the first device may correspond to a telematics unit in a vehicle and the second and third devices may correspond to user devices in the vehicle that are receiving information from the telematics unit.

In the system and methods disclosed herein, a device may evaluate a connection request received from another device to determine whether the connection request is intended to request a data connection or distribute data (e.g., the connection request carries data, designated as a friendly name, but does not identify another device). For example, a device may recognize that the connection request is carrying data based on a format or content of the data and/or based on no connection being available to the other device that sent the connection request.

FIGS. 1A-1D show an exemplary environment 100 in which systems and/or methods described herein may be implemented. As illustrated in FIGS. 1A-1C, environment 100 may include, for example, devices 110 (shown in FIGS. 1A-1C as a first device 110-A, a second device 110-B, and one or more third devices 110-C) that establish and communicate via a WPAN 120.

Devices 110 may include, for example, a personal communications system (PCS) terminal (e.g., that may combine a cellular radiotelephone with data processing and data communications capabilities), a wireless device, a smart phone, a tablet, a personal digital assistant (PDA) (e.g., that can include a radiotelephone, a pager, Internet/intranet access, etc.), a laptop computer (e.g., with a wireless air card), a global positioning system (GPS) device, a gaming device, a portable media player, a consumer electronics device, or other types of computation or communication devices. In another implementation (described in greater detail below with respect to FIGS. 2A and 2B), environment 100 may correspond to a vehicle 200, and one of the devices 110 may correspond to a vehicle telematics unit 210.

As described herein, devices 110 may employ one or more short-range wireless communication standards to communicate via WPAN 120. Device 110 may employ, for example, IEEE 802.15 (e.g., Bluetooth®) discovery protocols or Bluetooth®-derivative protocols for WPAN 120. It should be appreciated however, that other local wireless network protocols that enable passive device discovery (e.g., Wi-Fi, IrDA, etc.) may be used for WPAN 120.

WPAN 120 may be included in a larger network, such as a communications network and/or data network that connect to one or more devices 110. For example, WPAN 120 may include a local area network (LAN), a wide area network (WAN), a metropolitan area network (MAN), a wireless network, an optical fiber (or fiber optic) network, or a combination of networks. In addition or alternatively, WPAN 120 may be included in a radio network capable of supporting wireless communications to/from one or more devices 110, and the radio network may include, for example, a long-term evolution (LTE) network, another 3rd Generation Partnership Project (3GPP) 3G/4G network, Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), enhanced high-rate packet data (eHRPD), or a network implemented in accordance with future wireless network standards. In another implementation, WPAN 120 may be included in one or more private Internet Protocol (IP) networks that use a private IP address space. For example, WPAN 120 may be included a local area network (LAN), an intranet, a private wide area network (WAN), a virtual private network (VPN), etc.

As shown in FIG. 1A, first device 110-A may forward a friendly name 101 to second device 110-B and/or third devices 110-C during a first time period ($T_1$). Friendly name 101 may be included in and/or sent along with a connection request, a data transmission, a presence notification, or other type of message. Friendly name 101 may include at least a portion of, for example, a serial number, a mobile station identifier (MSID), a mobile identification number (MIN), a telephone number, a network address, etc.

First device 110-A may attempt to initiate a connection with second device 110-B and/or third devices 110-C (e.g., when first device 110-A is in a discoverable mode) by broadcasting a connection request that includes a device name (e.g., friendly name 101). The connection request may further include information identifying a device class or type associated with first device 110-A, a list of services offered by first device 110-A, and other technical information, such as information identifying features associated with first device 110-A, an associated manufacturer, communications protocols that are accepted by first device 110-A, a clock offset used by first device 110-A, etc. Each device 110 in environment 100 may have a unique alphanumeric address (48-bits in Bluetooth), but first device 110-A usually does not forward an alphanumerical address, as friendly name 101, when establishing a connection via a Bluetooth® WPAN 120. Instead, friendly name 101 may include word or phrase that allows a user to easily identify a device without requiring extensive technical knowledge. Friend name 101 may identify, for example, a device type, a manufacturer, a function, a location, an available service, a physical attribute, a status, and/or other characteristics associated with first device 110-A. The friendly name 101 may be set by a device manufacturer and/or may be configured based on a user input.

In one implementation, a data connection may be established between first device 110-A and second device 110-B based on friendly name 101 via the WPAN (e.g., "in-band communications"). For example, second device 110-B may determine, based on friendly name 101, whether to establish the data connection with first device 110-A. For example, second device 110-B may determine whether friendly name 101 is included in a list of devices approved for pairing. In another example, second device 110-B may present friendly name 101 within a list of available devices 110 (e.g., devices 110 available to pair with second device 110-B), and second device 110-B may receive a user input indicating whether to establish the data connection with first device 110-A.

FIG. 1B shows environment 100 during a second time period ($T_2$), that is subsequent to first time period $T_1$. As shown in FIG. 1B, first device 110-A and second device 110-B may exchange data 102 via in-band communications. For example, first device 110-A and second device 110-B may exchange data 102 via a communication channel that is established based on friendly name 101 forwarded during first time period $T_1$. Data 102 may be formatted, encrypted, encoded, etc. to prevent unauthorized access, such as by third devices 110-C. In order to minimize interference between communication channels and to minimize unauthorized access to data 102, WPAN 120 may not support multiple communication channels between devices 110. Thus, after the communication channel is established via WPAN 120 between first device 110-A and second device 110-B to exchange data 102, first device 110-A may stop transmitting friendly name 101 and/or may refuse a connection request received from third devices 110-C.

In the implementation shown in FIG. 1B, first device 110-A may form a modified friendly name 103 that includes additional and/or different information than that which was included in friendly name 101, and first device 110-A may provide modified friendly name 103 to third devices 110-C via out-of-band signaling. For example, first device 110-A may form modified friendly name 103 by replacing at least a portion of friendly name 101 with other information to be provided to third devices 110-C. For example, modified friendly name 103 may include a portion of data 102 being exchanged with second device 110-B. In another example, modified friendly name 103 may include information regarding a status of first device 110-A and/or second device 110-B (e.g., the status that first device 110-A and second device 110-B are exchanging data 102 and are, therefore, unavailable for a data connection with third devices 110-C via WPAN 120). In another example, a first portion of modified friendly name 103 may include a particular series of characters or other code to indicate to second device 110-B and/or third devices 110-C that a second portion of modified friendly name 103 is carrying usable data. In yet another example, modified friendly name 103 may includes an identifier or other code such as a prefix) indicating a change from friendly name 101. In this example, modified friendly name 103 may include the prefix (or other fixed-length identifier)), a character separator, the additional data, another character separator, and at least a portion of device identifier 101.

In one implementation, modified friendly name 103 may be included in or transmitted by first device 110-A in connection with a connection request. However, modified friendly name 103 may not include sufficient information for third device 110-C to establish a connection with first device 110-A (e.g., since a portion of friendly name 101 is replaced with other information). Accordingly, modified friendly name 103 is depicted unidirectionally, from first device 110-A to third device 110-C. Instead, third devices 110-C may parse the connection request from first device 110-A to recover the information embedded in modified friendly name 103. In this way, first device 110-A may provide data 102 to second device 110-B while also multicasting addition information to third device 110-C as modified friendly name 103.

In another implementation shown in FIG. 1C, second device 110-B may form modified friendly name 103, and second device 110-B may forward modified friendly name 103 to third devices 110-C via WPAN 120. For example, second device 110-B may form a connection request that, instead of identifying the device type, manufacturer, available service, and/or the other characteristics associated with second device 110-B, includes information to be forwarded to third devices 110-C. For example, modified friendly name 103 may include a portion of data 102 received from first device 110-A. In another example second device 110-B may modify a connection request or other communication forwarding friendly name 101 associated with first device 110-A to include the additional information.

As described above with respect to FIG. 1B, modified friendly name 103 may not include sufficient information for third device 110-C to establish a connection with second device 110-B since modified friendly name 103 may not include information that is related to establishing the connection. Accordingly, modified friendly name 103 is depicted unidirectionally, from second device 110-B to third device 110-C. Instead, third devices 110-C may parse the connection request from first device 110-B to recover the information embedded in modified friendly name 103. In this way, second device 110-B may receive data 102 from first device 110-A, while also multicasting information (e.g., a portion of data 102) to third device 110-C as modified friendly name 103.

In another implementation shown in FIG. 1D, first device 110-A may forward modified friendly name 103 to one or more other devices (e.g., second device 110-B and/or third device(s) 110-C) without establishing the communications channel and transmitting data 102. For example, if a maximum number of channels is already established in WPAN 120 or first device 110-A simply does not wish to transmit data 102, modified friendly device name 103 may be used for out-of-band data transmissions.

In FIGS. 1A-1D, the particular arrangement and number of components of environment 100 are illustrated with simplicity to enhance clarity of presentation. In practice, environment 100 may include additional, fewer, and/or different components. For example, first device 110-A and second device 110-B may exchange data 102 via a first WPAN 120, while modified friendly name 103 may be associated with second, different WPAN 120. Furthermore, functions described as being performed by a component in environment 100 may be performed by a different component and/or by multiple components in environment 100. For example, modified friendly name 103 may be generated by first device 110-A, and second device 110-B may forward the modified friendly name 103 to third devices 110-C.

Figure 2B:
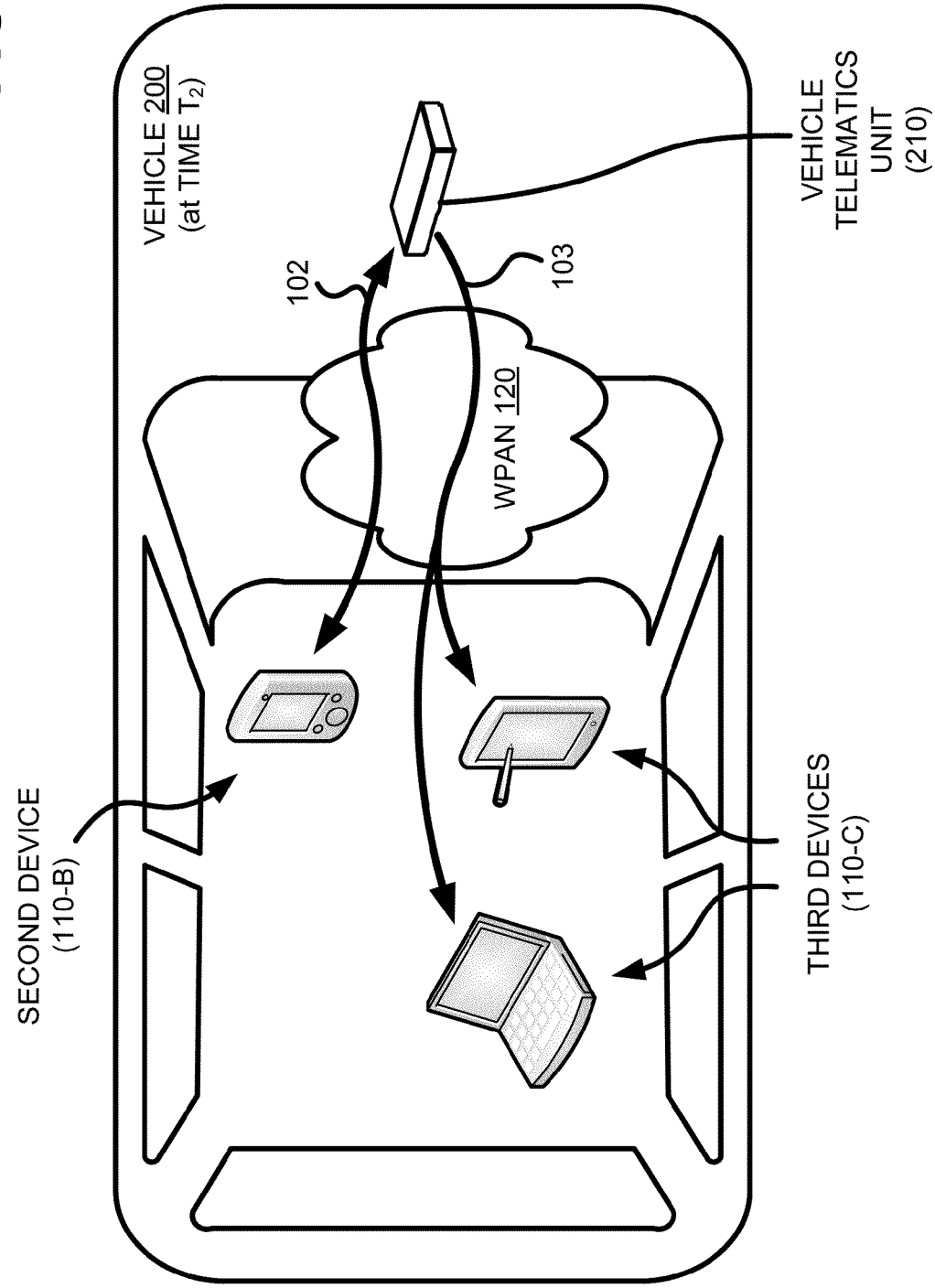

As shown in FIGS. 2A and 2B, environment 100 may correspond at times $T_1$ and $T_2$, respectively, to a vehicle 200, and one of the devices 110 may correspond to a vehicle telematics unit 210. In the example illustrated in FIGS. 2A and 2B, vehicle telematics unit 210 corresponds to first device 110-A. It should be appreciated, however, that vehicle telematics unit 210 may also function as second device 110-B (e.g., to receive friendly name 101 and data 102 from first device 110-A) or third device 110-C (e.g., to receive modified friendly name 103 from first device 110-A) in other implementations.

Vehicle telematics unit 210 may include a data collection system configured for installation in vehicle 200. For example, vehicle telematics unit 210 may receive data generated by vehicle sensors and/or a vehicle electronic control unit (ECU) (not shown) included in vehicle 200. An ECU may transmit status and diagnostic information over a shared, standardized electronic bus (not shown) in vehicle 200. The bus effectively functions as an on-board computer network, with many processors transmitting and receiving data via the bus. Data provided by the ECU to vehicle telematics unit 210 may include, for example, vehicle speed, fuel level, engine temperature, intake manifold pressure, etc., associated with vehicle 200. Vehicle telematics unit 210 may be capable of communicating with devices 110 via a short-range wireless network, such as WPAN 120.

In one implementation, vehicle telematics unit 210 may include a position determining mechanism to determine a geographic location associated with vehicle 200. For example, vehicle telematics unit 210 may include a sensor to receive a location signal from a global position system (GPS) or another location service. In another example, vehicle telematics unit 210 may determine a location of vehicle 200 based on other factors, such as by processing attributes (e.g., signal strength, delays, etc.) of transmissions received from a communications network and/or a data network. Vehicle telematics unit 210 may determine additional information based on changes in the location of vehicle 200 (e.g., distances traveled by vehicle 200, a time that vehicle 200 is being operated, a velocity of vehicle 200, etc.).

As shown in FIG. 2A, vehicle telematics unit 210 may forward friendly name 101 to second device 110-B and/or third device 110-C at time $T_1$. Friendly name 101 may be transmitted in a connection request from vehicle telematics unit 210, and friendly name 101 may identify vehicle 200 and/or vehicle telematics unit 210. For example, friendly name 101 may specify that the connection request is being sent from a "Vehicle Telematics Unit." The connection request may further identify information and/or services available from vehicle telematics unit 210. For example, the connection request may specify information (e.g., a geographic location and/or a status of vehicle 200) that is available through vehicle telematics unit 210.

Referring now to FIG. 2B, vehicle telematics unit 210 may establish a communication channel with second device 110-B to exchange data 102 (e.g., data regarding vehicle 200 that is collected and/or determined by vehicle telematics unit 210) during time period $T_2$. Vehicle telematics unit 210 may further generate modified friendly name 103 that includes information regarding vehicle 200 (e.g., a portion of data 102), and vehicle telematics unit 210 may also transmit modified friendly name 103 to third devices 110-C during time period $T_2$. As previously described with respect to FIG. 1B, modified friendly name 103 may be generated by removing an identifier of a sending device (e.g., vehicle telematics unit 210 in the example shown in FIGS. 2A and 2B) and may replace the identifier with information to be provided to third devices 110-C. For example, modified friendly name 103 may identify a geographic location (e.g., GPS data) associated with vehicle 200. In this example, third device 110-C may parse modified friendly name 103 to identify the geographic location of vehicle 200.

In another implementation shown in FIG. 2C, vehicle telematics unit 210 may forward modified friendly name 103 to one or more other devices (e.g., second device 110-B and/or third device(s) 110-C) without establishing the in-band communications channel and transmitting data 102. For example, if a maximum number of channels is already established in WPAN 120 or vehicle telematics unit 210 simply does not wish to transmit data 102, modified friendly device name 103 may be used for out-of-band data transmissions from vehicle telematics unit 210.

In FIGS. 2A and 2C, the particular arrangement and number of components associated with vehicle 200 are illustrated with simplicity to enhance clarity of presentation. In practice, vehicle 200 may include or may be associated with additional, fewer, and/or different components. Furthermore, functions described as being performed by a component in vehicle 200 may be performed by a different component and/or by multiple components in vehicle 200.

FIG. 3 is a diagram illustrating exemplary components of a user device 300. Each device 110 may be implemented/installed as a combination of hardware and software on one or more user devices 300. As shown in FIG. 3, user device 300 may include, for example, a bus 310, a processing unit 320, a memory 330, one or more input devices 340, one or more output devices 350, and a communication interface 360.

Bus 310 may permit communication among the components of user device 300. Processing unit 320 may include one or more processors or microprocessors that interpret and execute instructions. In other implementations, processing unit 320 may be implemented as, or include, one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits a user to input information to user device 300, such as one or more of a keyboard, a keypad, a mouse, a pen, a microphone, one or more biometric mechanisms, and the like. Output device 350 may include a device that outputs information to the user, such as a display, a speaker, etc.

Communication interface 360 may include any transceiver-like mechanism that enables user device 300 to communicate with other devices and/or systems. For example, communication interface 360 may include mechanisms for communicating with other devices, such as other devices 110 of environment 100. In one implementation, communication interface 360 may support short range wireless network communications (e.g., via Bluetooth® protocols). In other implementations, communication interface 360 may support other wired or wireless network communications.

As described herein, user device 300 may perform certain operations in response to processing unit 320 executing software instructions stored in a computer-readable medium, such as memory 330. A computer-readable medium may include a non-transitory tangible memory device. A memory device may be implemented within a single physical memory device or spread across multiple physical memory devices. The software instructions may be read into memory 330 from another computer-readable medium or read into memory 330 from another device via communication interface 360. The software instructions stored in memory 330 may cause processing unit 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of user device 300, in other implementations, user device 300 may include fewer components, different components, differently-arranged components, or additional components than those depicted in FIG. 3. As an example, in some implementations, a display may not be included in user device 300. In these situations, user device 300 may be a "headless" device that does not include input device 340. Alternatively, or additionally, one or more components of user device 300 may perform one or more other tasks described as being performed by one or more other components of user device 300.

FIG. 4 is a block diagram of exemplary components of vehicle telematics unit 210. As shown in FIG. 4, vehicle telematics units 210 may include components 310-360 described above with respect to user device 300 of FIG. 3. In vehicle telematics units 210, communication interface 360 may further include an on-board diagnostics (OBD) interface 410.

OBD interface 410 may include a physical connector interface for use with a vehicle's on-board diagnostic systems. For example, OBD interface 410 may be configured to receive diagnostic and/or control information from a vehicle implementing OBD-II, Heavy Duty (HD) OBD, or another on-board diagnostic system protocol. In one implementation, OBD interface may also receive power from the vehicle (e.g., a vehicle battery) to run vehicle telematics unit 210. Vehicle telematics unit 210 may also be directly coupled to the communication bus (not shown) on vehicle 200, such as when a vehicle manufacturer installs the telematics unit when assembling vehicle 200. In such installations, vehicle telematics unit 210 does not need to couple via an OBD-II connector.

Although FIG. 4 shows exemplary components of vehicle telematics unit 210, in other implementations, vehicle telematics unit 210 may include fewer components, different components, differently-arranged components, or additional components than those depicted in FIG. 4. For example, vehicle telematics unit 210 may include a power supply (e.g., one or more batteries or other power source components) to supply power to components of vehicle telematics unit 210 and/or control logic to control application of power from an external power source (e.g., a vehicle battery) to one or more components of vehicle telematics unit 210. Alternatively, or additionally, one or more components of vehicle telematics unit 210 may perform one or more other tasks described as being performed by one or more other components of vehicle telematics unit 210.

FIG. 5A shows a schematic representation of a connection request 510, carrying friendly name 101, that may be sent by first device 110-A. As previously described, first device 110-A may send the connection request 510 to second device 110-B and/or third devices 110-C to request a pairing (e.g., to establish a connection via WPAN 120). As shown in FIG. 5A, connection request 510 may carry a first data unit 501 (e.g., a packet) that includes friendly name 101 and additional connection request data 520. For example, first data unit 501 may include a field designated for storing friendly name 101. Additional connection request data 520 may include information identifying a device class or type associated with first device 110-A, a list of services offered by first device 110-A, and other technical information, such as information identifying features associated with first device 110-A, an associated manufacturer, communication protocols that are accepted by first device 110-A, a clock offset used by first device 110-A, etc.

FIG. 5B shows a shows a schematic representation of a modified connection request 530 carrying modified friendly name 103 and modified additional connection request data 550. As previously described, modified friendly name 103 may include additional data that is added to or replaces at least a portion of the original friendly name 101, and first device 110-A may send the modified connection request 530 to second device 110-B and/or third devices 110-C for out-of-band transmission of the additional data. As shown in FIG. 5B, modified connection request 530 may carry a second data unit 502 (e.g., a packet) that includes modified friendly name 103. For example, second data unit 502 may include a field for carrying modified friendly name 103. In another example, second data unit 502 may include a first field for carrying at least a portion of friendly name 10 and a second field for carrying the additional data.

Modified friendly name 103 may be unrelated to connection request 510 and, instead may identify and/or include information to be transmitted from first device 110-A to third devices 110-C. For example, modified friendly name 103 may include a uniform resource locator (URL) identifying information to be accessed by third user devices 110-C.

In one implementation, modified additional connection request data 550 in second data unit 502 may include information indicating that modified friendly name 103 includes information transmitted from first device 110-A. For example, modified additional connection request data 550 may include instructions directing third devices 110-C to parse modified friendly name 103 to obtain the associated information. In another example, modified additional connection request data 550 may include information indicating that third data unit 503 includes information to be extracted and/or that a connection to first device 110-A is unavailable via WPAN 120.

FIG. 5C shows a schematic representation of a composite message 560, carrying data 102 and modified friendly name 103, that may be sent by first device 110-A. As shown in FIG.

5C, composite message 560 may carry a third data unit 503 that includes data 102 and second data unit 502 that includes modified friendly name 103. For example, composite message 560 may be a time-division multiplexed (TDM) signal that carries second data unit 502 and third data unit 503 on a single frequency or frequency band. For example, first device 110-A may selectively transmit portions of second data unit 502 and third data unit 503 at different times during time period $T_2$. In another implementation, first device 110-A may selectively transmit portions of second data unit 502 and third data unit 503 using different frequencies or frequency bands (e.g., using frequency division multiplexing) during time period $T_2$.

As shown in FIG. 5C, third data unit 503 may include data 102 and communications data 540. For example, communications data 540 may relate to establishing and maintaining a connection between first device 110-A and second device 110-B. For example, communications data 540 may identify a session between first device 110-A and second device 110-B. In another example, data 102 may be encrypted, encoded, formatted, etc., to prevent unauthorized usage by third device 120-C or any other devices, and communications data 540 may include information, such as a decryption key, that enables second device 110-B to extract data 102 from composite message 560.

In FIGS. 5A-5C, the particular arrangement and number of packet elements associated with connection request 510, modified connection request 530, and composite message 560 are illustrated with simplicity to enhance clarity of presentation. In practice, connection request 510, modified connection request 530, and/or composite message 560 may include or may be associated with additional, fewer, and/or different types of packet elements.

FIG. 6 is a flow chart of an exemplary process 600 for transmitting data to multiple devices 110 within, or in communication via, WPAN 120. In one implementation, process 600 may be performed by first device 110-A (e.g., a "master" device) such as vehicle telematics unit 210. In other implementations, process 600 may be performed by a different device 110 or by multiple devices 110 of environment 100, such as by first device 110-A and second device 110-B. Process 600 is described with reference to components in environment 100 shown in FIGS. 1A-1C.

As shown in FIG. 6, process 600 may include transmitting friendly name 101 (block 610). For example, as described above with respect to FIG. 1A, first device 110-A may transmit a connection request during time $T_1$, and the connection request may include friendly name 101 associated with first device 110-A. Friendly name 101 may identify, among other things, a device type, a manufacturer, an available service, and/or other characteristics associated with first device 110-A. In one example described in the discussion of FIG. 2A, vehicle telematics unit 210 may forward friendly name 101 that includes text such as "vehicle telematics unit" in a connection request sent to second device 110-B.

Continuing with FIG. 6, process 600 may further include modifying friendly name 101 based on first data (block 620) and transmitting the modified friendly name 103 to second device 110-B and/or third device 110-C (block 630). For example, first device 110-A may add the first data to friendly name 101 (e.g., augment the friendly name with the first data) and/or replace at least a portion of friendly name 101 with the first data to form modified friendly name 103. For example, as described in the discussion of FIG. 2B, vehicle diagnostic unit 210 may form a modified friendly name 103 that replaces text, such as "vehicle diagnostic unit," with data regarding vehicle 200. For example, vehicle telematics unit 210 may form a connection request that identifies a location (e.g., GPS coordinate) or other information associated with vehicle 200 instead of and/or in addition to the vehicle telematics unit 210 information. First device 110-A may transmit the modified friendly name 103 to second device 110-B and/or third device 110-C for out-of-band transmission of the data.

As further shown in FIG. 6, process 600 may also include optionally establishing a connection with another device and transmitting data 102 to the other device via the connection (block 640). For example, as described above with respect to FIG. 1B, first device 110-A may transmit data 102 during time $T_2$ via a connection established with second device 110-B (e.g., via in-band communications). As further described in FIG. 5C, first device 110-A may transmit data 102 within composite message 560.

FIG. 7 is a flow chart of an exemplary process 700 for handling a connection request within WPAN 120. In one implementation, process 700 may be performed by second device 110-B or third device 110-C (e.g., a "slave" device). In other implementations, process 700 may be performed by a different device 110 or by multiple devices 110 of environment 100. Process 700 is described with reference to components in environment 100 shown in FIGS. 1A-1C.

As shown in FIG. 7, process 700 may include receiving a connection request (block 710). For example, third device 110-C may receive connection request 510 that includes friendly name 101 or may receive modified connection request 530 or composite message 560 that includes modified friendly name 103.

For example, as shown in FIG. 7, third device 110-C may determine whether a connection is established between first device 110-A and second device 110-B (block 720). In one example, third device 110-C may determine whether first device 110-A is available for a pairing (e.g., connection is not established between first device 110-A and second device 110-B) and infer that the received connection request includes friendly name 101 when first device 110-A is available for a pairing. For example, third device 110-C may attempt to pair with first device 110-A, and may determine that first device 110-A is not connected to second device 110-B when first device 110-A is available for a pairing.

Continuing with FIG. 7, if the connection is not established between first device 110-A and another device (block 720-No), process 700 may include third device 110-C evaluating the received connection request to determine whether a received connection request is associated with friendly name 101 or modified friendly name 103 (block 740). For example, third device 110-C may determine whether the received connection request includes information that may be used to identify and/or establish a connection to first device 110-A or whether the received connection request includes information designated as a friendly name but is unrelated to first device 110-A. In another example, third device 110-C may evaluate a format and/or content of the information designated as a friendly name to determine whether this information actually identifies a device or carries other information. In yet another example, third device 110-C may compare data identified as the friend name to information received in prior connection requests from first device 110-A and determine whether the friendly name has be changed.

Continuing with FIG. 7, if the connection is not established between first device 110-A and another device (block 720-No), process 700 may include establishing a data connection based on the friendly name (block 740) ock 740). For example, as described above with respect to FIG. 1B, a connection may be established between first device 110-A and second device 110-B to carry data 102.

As shown in FIG. 7, process 700 may also include, if the connection is established between first device 110-A and another device (block 720-Yes) or if the connection request includes modified friendly name 103 (block 730-Yes), parsing the connection request to obtain the data designated as modified friendly name 103 (block 750). In the example shown in FIG. 5B, data from modified friendly name 103 may be extracted from second data unit 502.

Thus, in the systems and methods described herein, a device may forward a message, such as a connection request, via a WPAN, and the message may include information designated as a friendly name. When the device is attempting to pair to another device (e.g., by establishing a connection via the WPAN), the friendly name may include information, such as name, manufacturer, or other feature, associated with the device. When the device is already paired and the device is exchanging data via a connection over the WPAN, the friendly name may be unrelated to identifying the device and may, instead, carry information for distribution via the WPAN and outside of the connection. In this way, the device may distribute information to multiple other devices in a WPAN even if the WPAN limits a quantity of data connections.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Also, while a series of blocks has been described with respect to processes 600 and 700 in FIGS. 6 and 7, the order of the blocks in processes 600 and 700 may be modified in other implementations to include additional, fewer, and/or different blocks. For example, process 700 may further include second device 110-B, when receiving the data 102 via the data connection established in WPAN 120, forming and forwarding a modified connection request with modified friendly name 103 that includes a portion of the received data, as described above with respect to FIG. 1C. Further, non-dependent blocks in processes 600 and 700 may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    transmitting, by a processor associated with a first device, a connection request to second device that differs from the first device, wherein the connection request includes an identifier for the first device, and wherein the connection request relates to a wireless personal area network (WPAN) associated with the first device;
    receiving, by the processor, an acceptance of the connection request from the second device;
    exchanging, by the processor and after receiving the acceptance, first data between the first device and the second device, wherein the first data is exchanged via an in-band communication associated with the WPAN;
    modifying, by the processor, the connection request to form a modified connection request, wherein modifying the connection request includes:
        modifying, in the connection request, identifier to include second data; and
    transmitting, by the processor, the modified connection request through out-of-band signaling toward the second device, wherein the second device extracts the second data from the modified connection request.

2. The method of claim 1, further comprising:
    transmitting the modified connection request toward a third device that differs from the first device and the second device, wherein the third device is not connect to the first device via the WPAN, and wherein the third device extracts the second data from the modified connection request.

3. The method of claim 1, wherein transmitting the modified connection request and exchanging the first data occur concurrently.

4. The method of claim 1, wherein modifying the connection request further includes:
    including, in the modified connection request, information indicating that that the second data does not identify the first device.

5. The method of claim 1, wherein the identifier includes data identifying at least one of a device type, a manufacturer, a function, a location, an available service, a physical attribute, a status, a characteristic associated with the first device, and wherein modifying the identifier further includes:
    replacing, in the modified connection request, the identifier with the second data.

6. The method of claim 1, wherein first device is included in a telematics device associated with a vehicle, and wherein the second device is associated with a driver or a passenger of the vehicle.

7. The method of claim 6, wherein the second data includes information about the vehicle that is collected by the telematics device.

8. A device comprising:
    a memory configured to store an identifier associated with the device; and
    a processor configured to:
        transit a connection request to another device, wherein the connection request includes the identifier, and wherein the connection request relates to a wireless personal area network (WPAN) associated with the device;
        receive an acceptance of the connection request from the other device;
        exchange, after receiving the acceptance, first data between the device and the other device, wherein the first data is exchanged via an in-band communication associated with the WPAN;
modify the connection request to form a modified connection request, wherein processor, when modifying the connection request, is further configured to modify the identifier to include second data and
transmit the modified connection request through out-of-band signaling to the other device, wherein the other device extracts the second data from the modified connection request.

9. The device of claim 8, wherein the device is a first device and the other device is a second device, and wherein the processor is further configured to:
transmit the modified connection request toward a third device that differs from the first device and the second device, wherein the third device is not connect to the first device via the WPAN, and wherein the third device extracts the second data from the modified connection request.

10. The device of claim 8, wherein the processor is further configures to transmit the modified connection request and exchange the first data concurrently.

11. The device of claim 8, wherein the processor, when modifying the connection request, is further configured to:
add, in the modified connection request, the second data to the identifier.

12. The device of claim 8, wherein the connection request further includes information identifying at least one of:
a device class associated with the device,
a service offered by the device,
a feature of the device,
a manufacturer of the device,
a set of communication protocols that are accepted by the device, or
a clock offset used by the device.

13. The device of claim 8, wherein the processor, when modifying the connection request, is further configured to:
include, in the modified connection request, information indicating that that the second data does not identify the device.

14. The device of claim 8, wherein an on-board diagnostics (OBD) interface collects information associated with a vehicle, and wherein the second data includes the information associated with the vehicle that is collected by the OBD interface.

15. A non-transitory computer readable medium to configured to store: one or more instructions that, when executed by a processor associated with a first device to: transmit a connection request to a second device, wherein the connection request includes an identifier for the first device, and wherein the connection request relates to a wireless personal area network (WPAN) associated with the first device; receive an acceptance of the connection request from the second device; exchange, after receiving the acceptance, first data between the first device and the second device, wherein the first data is exchanged via an in-band communication associated with the WPAN; modify the connection request to form a modified connection request, wherein the one or more instructions further cause the processor, when modifying the connection request, to modify the identifier to include second data; and transmit the modified connection request through out-of-band signaling to the second device, wherein the second device extracts the second data from the modified connection request.

16. The non-transitory computer readable medium of claim 15, wherein the one or more instructions further cause the processor to:
transmit the modified connection request toward a third device that differs from the first device and the second device, wherein the third device is not connect to the first device via the WPAN, and wherein the third device extracts the second data from the modified connection request.

17. The non-transitory computer readable medium of claim 15, wherein the one or more instructions further cause the processor, when modifying the connection request, to:
include, in the modified connection request, information indicating that that the second data does not identify the device.

18. The non-transitory computer readable medium of claim 15, wherein the WPAN implements Bluetooth® protocols.

19. The non-transitory computer readable medium of claim 15, wherein the second device is associated with a telematics unit associated with a vehicle, and wherein the second data includes information about the vehicle that is collected by the telematics unit.

20. The non-transitory computer readable medium of claim 15, wherein the connection request further includes third information identifying at least one of:
a device class associated with the first device,
a service offered by the first device,
a feature of the first device,
a manufacturer of the first device,
a communication protocols that are accepted by the first device, or
a clock offset used by the first device, wherein the third information is included in the modified connection request.

* * * * *